United States Patent

Hurst

Patent Number: 5,152,865
Date of Patent: Oct. 6, 1992

[54] METHOD FOR CLEAN REMOVING LABELS FROM CONTAINERS

[76] Inventor: Richard F. Hurst, 1101 River Beach Dr., NV516, Fort Lauderdale, Fla. 33315

[21] Appl. No.: 696,363

[22] Filed: May 6, 1991

[51] Int. Cl.⁵ .............................................. B32B 35/00
[52] U.S. Cl. .................................. 156/344; 156/584; 15/93.1; 15/236.01; 30/169
[58] Field of Search ............... 156/344, 584; 15/93.1, 15/236.01, 236.03; 30/169; 29/402.03; 264/334

[56] References Cited

U.S. PATENT DOCUMENTS

| | | | |
|---|---|---|---|
| 4,122,734 | 10/1978 | Hurst | 82/122 X |
| 4,220,481 | 9/1980 | Bleiman et al. | 156/584 X |
| 4,325,775 | 4/1982 | Moeller | 156/584 |
| 4,717,442 | 1/1988 | Hopson | 156/584 |
| 4,834,826 | 5/1989 | Abe et al. | 156/584 X |
| 4,944,832 | 7/1990 | Abe et al. | 156/584 |

Primary Examiner—Michael W. Ball
Assistant Examiner—Mark A. Osele
Attorney, Agent, or Firm—John B. Sowell

[57] ABSTRACT

An apparatus and a method is provided for removing an adhesive backed label from a cylindrical container and includes the steps of positioning a tilted blade at an attack angle which forces the blade behind the label between the adhesive and the cylindrical container and the speed of descent of the blade and the rotational speed of the container is adjusted so as to peel the label from the container with the adhesive side out as an integral unit.

9 Claims, 3 Drawing Sheets

METHOD FOR CLEAN REMOVING LABELS FROM CONTAINERS

BACKGROUND OF THE INVENTION

1. Field of the Invention

The present invention relates to label removing and label stripping machines of the type adapted to remove labels which are attached by adhesive to cylindrical shaped containers. More particularly the present invention is related to an improved semi-automatic label removing machine which removes both the label and the adhesive as an integral unit without forming particulate.

2. Description of the Prior Art

Heretofore printed labels which were placed on cylindrical glass containers were made from paper, foil and plastic. The paper labels are most commonly varnished, clay coated fiber paper stock. When such paper labels are removed by prior art label stripping machines of the type set forth in my U.S. Pat. No. 4,122,734 the label was spirally cut and removed creating large amounts of dust and particulate which clogged the machine and affected its operability as well as created a pollution hazard. Even though plastic and foil labels do not create clay dust, they still produce a large amount of particulate which also produces problems for cleanliness of the machine and its environment.

Heretofore the spiral stripping motion of paper labels leaves a substantial adhesive residue on the bottles. Not only is there some adhesive left on the bottles but there is adhesive on the particulate that becomes statically charged and reattaches itself not only to the bottles but to the machinery which requires additional cleaning of the machine and requires post-stripping cleaning of the bottles.

SUMMARY OF THE INVENTION

The present invention essentially eliminates the adhesive residue left on the bottles and at the same time substantially eliminates all of the particulate and removes the adhesive coated label as an integral unit so there is no particulate other than the unit label which can easily be removed.

It is a primary object of the present invention to provide a novel label removing apparatus.

It is another principal object of the present invention to provide a novel label removing apparatus which can be embodied in an automatic or semi-automatic machine.

It is another primary object of the present invention to provide a label removing apparatus which can be adjusted to remove different types of labels from different size bottles without generating particulate.

It is another principal object of the present invention to provide a novel label stripping apparatus which peels the adhesive back label from the bottle or container by forcing a tilted blade between the adhesive and the bottle to remove and fold the label and the adhesive as an integral unit formed as an adhesive side out skirt.

It is another object of the present invention to squeeze and peel adhesive backed labels from glass containers by reverse folding the adhesive label into an adhesive side out cylindrical shaped skirt.

It is another object of the present invention to provide a universal label removing apparatus which is adapted to remove labels from different sizes of cylindrical glass containers such as bottles, vials, test tubes, syringes and ampules.

It is a general object of the present invention to remove different types of adhesive backed labels by compressing the label in the vertical direction while expanding the horizontal dimension.

It is a general object of the present invention to remove a partial wrap around label as a flared adhesive out skirt.

It is another general object of the present invention to remove a full wrap around label as a cylindrical shaped skirt.

According to these and other objects of the present invention there is provided a novel method and apparatus for clean removing adhesive backed labels from cylindrical containers which comprises the steps of mounting the container having the adhesive backed label thereon on a rotating platform then engaging a tilted blade between the adhesive and the glass container and moving the tilted blade vertically so as to peel the adhesive backed label from the container by forcing the tilted blade between the adhesive and the container to remove the label and the adhesive as an integral unit which forms as an adhesive side out skirt that is larger in diameter than the original label. The novel method substantially reduces the amount of remaining residue which can be easily removed by vacuum or by hand if required.

In my U.S. Pat. No. 4,122,734 it was explained that different types of containers such as small hypodermic needle, vial type containers and bottles could be mounted on different types of rotary supports and clamped by a rotatable top mount so as to center the container in a label stripper apparatus. The razor blade used in the label stripper is known to produce a spiral strip when cutting and stripping the label from the container. Not only was the label not cleanly removed but parts of some label adhesive redeposited itself on different parts of the label stripper apparatus including the container which was being stripped for the intended purpose of reuse. Thus, the prior art label stripper while accomplishing the task of removing different types of adhesive backed labels generated a post-cleaning operation to remove adhesive particles and parts of adhesive labels from the container as well as unremoved adhesive from the container. As will be explained hereinafter the present invention label remover removes all types of adhesive backed labels in one piece and substantially removes all of the adhesive from the container.

Figure 1:
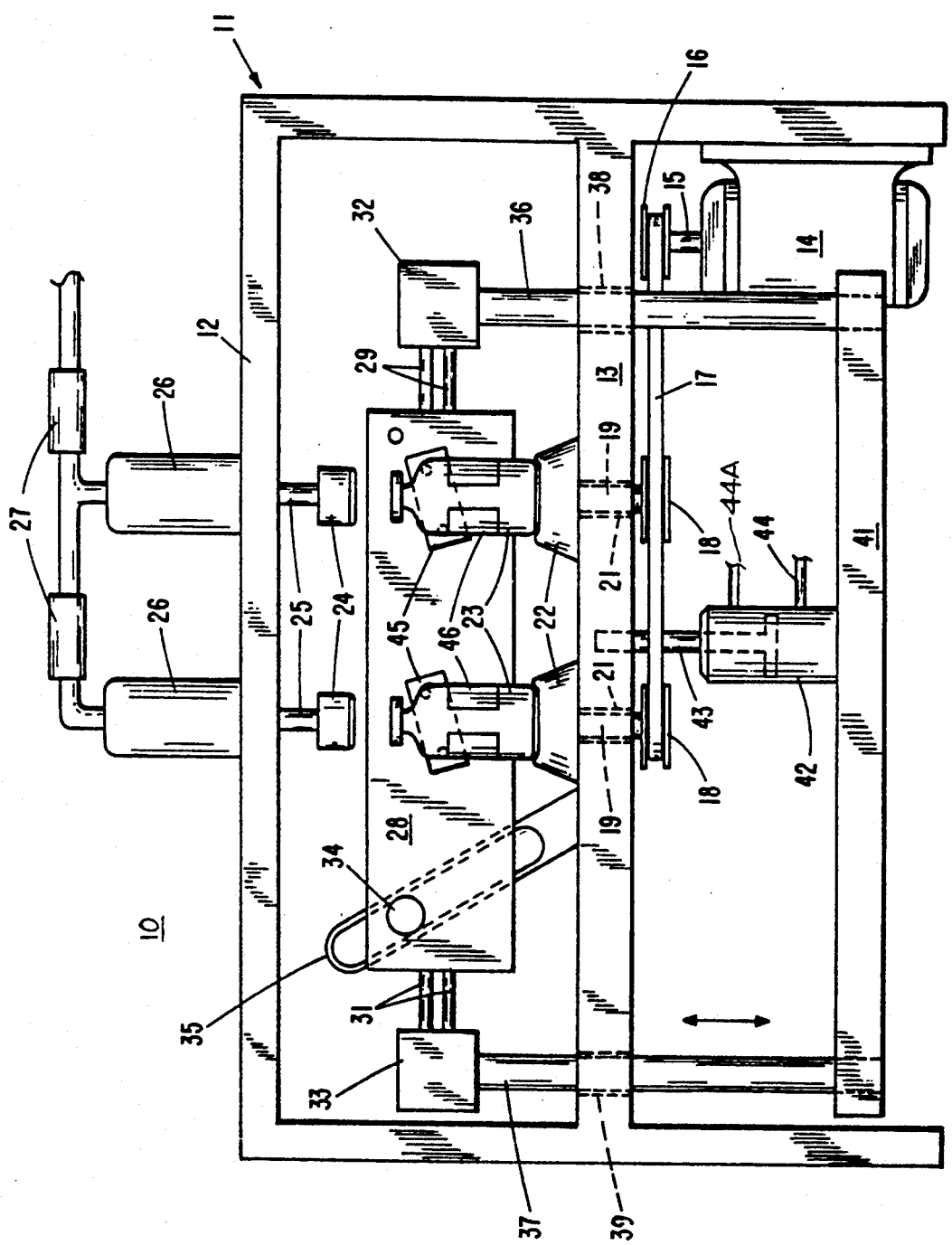
FIG. 1 is a front elevation in partial section of a preferred embodiment label removing machine.

Refer to FIG. 1 showing a front elevation in partial section of a preferred embodiment label removing machine 10 having a box shaped frame 11. The frame 11 has a top cross member 12 and a center cross member 13. A variable speed motor 14 is shown having a shaft 15 coupled to a drive pulley 16 which drives a belt 17 coupled to a plurality of driven pulleys 18. Each of the driven pulleys 18 is coupled to a shaft 19 rotatably mounted in bearing means 21 which are mounted in the center cross member 13. Rotating platforms 22 are attached by set screws (not shown) to the rotatable shafts 19 and are adapted to receive and center cylindrical containers 23 thereon. Rotatable idlers 24 are mounted on piston shafts 25 of clamp cylinders 26. A source of air (not shown) is coupled to air lines 27 which permits the pistons in air cylinders 26 to be actuated in a manner which clamps the tops of containers 23 in the rotatable idlers 24. Once the containers 23 are clamped, the variable speed motor 14 may be activated so as to rotate the containers 23 and the idlers 24 o the platforms 22.

Blade mounting means 28 is shown supported by a pair of cylindrical stub shafts 29 and 31 which are fixed in the blade mounting means 28 and slidably mounted in the cross blocks 32 and 33 respectively. Bearings in the cross blocks 32 and 33, such as sleeve bearings permit the blade mounting means 28 to be moved in a horizontal direction by means of a bearing 34 mounted on the blade mounting means 28 and cooperable with an inclined cam slot means 35 mounted on the center cross member 13. Thus, when the bearing block 28 is moved vertically, the bearing 34 is guided in the cam slot 35 so as to impart a horizontal movement of the stub shafts 29 and 31 which are slidably mounted in the cross blocks 32 and 33 respectively.

Cross blocks 32 and 33 are fixed onto and supported by vertically movable shafts 36 and 37. Shafts 36 and 37 are slidably mounted in bearings 38 and 39 mounted in center cross member 13. Vertical support shafts 36 and 37 are also fixed to a transverse lift bar 41 which is adapted to raise and lower the cross blocks 32 and 33 so as to raise and lower the blade mounting means 28.

A vertical lift air cylinder 42 is mounted on lift bar 41 and provided with a piston 43 having a shaft fixed and coupled to center cross member 13. Cylinder 42 is provided with an adjustable air supply (not shown) which is coupled to input/output air lines 44, 44A for actuating the air cylinder 42 so as to move the blade mounting means 28 vertically up and down. Blades 45 are shown tilted at an angle from the horizontal axis and aligned with the partial wrap around labels 46. The preferred tilt angle is 5 to 10 degrees but may be adjusted from one to thirty degrees in order to achieve peeling of the label as distinguished from cutting or stripping of the label.

Figure 2:
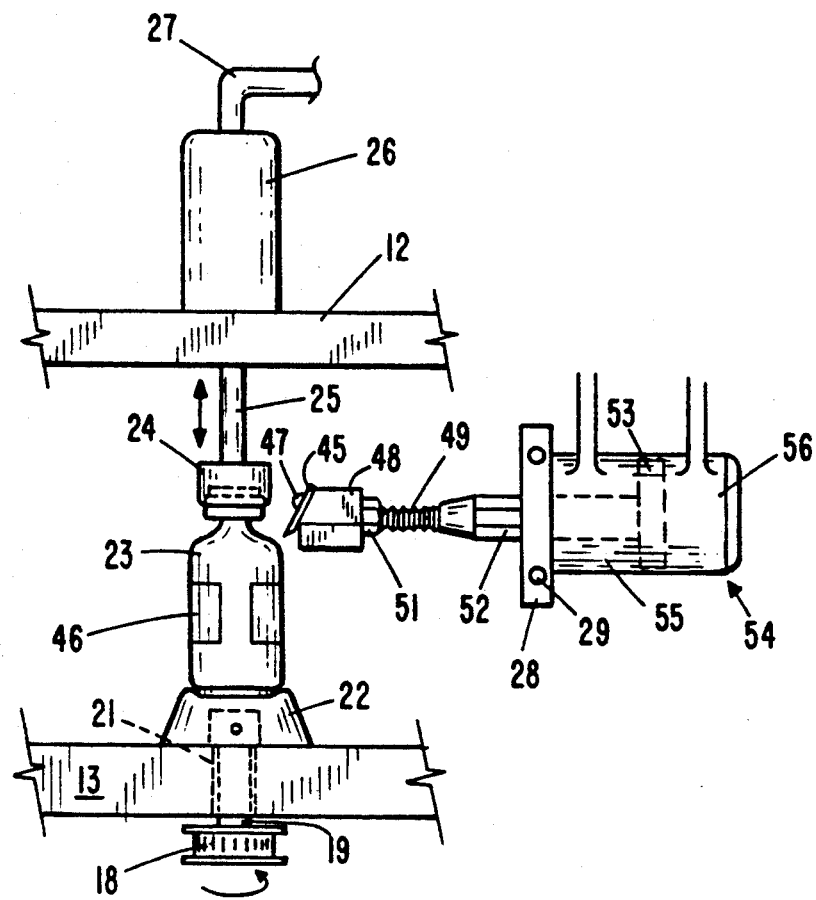
FIG. 2 is an enlarged elevation in side view of the preferred embodiment label removing machine shown in FIG. 1.

Refer now to FIG. 2 showing an enlarged elevation in side view of the preferred embodiment blade 45 mounted by screws 47 on blade holder 48 which is mounted on a threaded shaft 49. The tilt angle of the blade holder 48 can be manually adjusted and locked at a preferred horizontal tilt angle by means of lock nut or jam nut 51 also threadably mounted on shaft 49. Shaft 49 is an extension of a large non-rotating shaft portion 52 which is the shaft of a piston 53 of a blade motion cylinder 54. Cylinder 54 has a retractor portion 55 and a drive portion 56 which are coupled to an air supply (not shown). When air is entered into the portion 55 the blade 45 is retracted and when air is entered into the portion 56 the blade 45 is engaged against the container 23. As already explained hereinbefore the blade mounting means 28 which supports air cylinder 54 may be moved horizontally by the cam means 34, 35 and moved vertically by the vertical air lift cylinder 42. In the preferred embodiment mode of operation, the blade 45 is tilted at an angle between 5 and 10 degrees and slowly brought into vertical engagement with the label 46. Since the label 46 may be made of several different substances such as paper, foil and plastic known as the label stock and provided with different types of rear surface adhesive such as pressure sensitive adhesives, thermo plastic adhesives and gummed adhesives all of which may come in different thicknesses and chemical compositions there is no one angle of tilt for the blade which operates the best for all labels. If a large number of labels are to be removed a larger tilt angle will result in more rapid removal of the label. Similarly higher vertical speeds of the movement of the blade mounting means 28 will result in more rapid removal of the labels. Further, the variable speed motor 14 which drives the pulley 18 and determines the rotation of the container or bottle 23 also affects the speed of removal of the labels 46. Since different diameter containers 23 are usually encountered, the variable speed motor may be employed to compensate for the peripheral speed of the different diameter containers. This is to say that large diameter containers will have greater peripheral speeds than vials or syringes which have smaller diameters. Further, it will be understood that the clamps 24 and rotatable mounting platforms 22 are removable from their respective shafts 25 and 19 so as to provide idler clamps and rotatable platforms which center the type of container being inserted into the label removing machine 10. A trial with one or two containers will rapidly determine the maximum speed of rotation of the container and descent of the blade as well as the tilt angle of the blade to provide an optimum removal of the label 46 as an integral unit as will now be explained.

Figure 3:
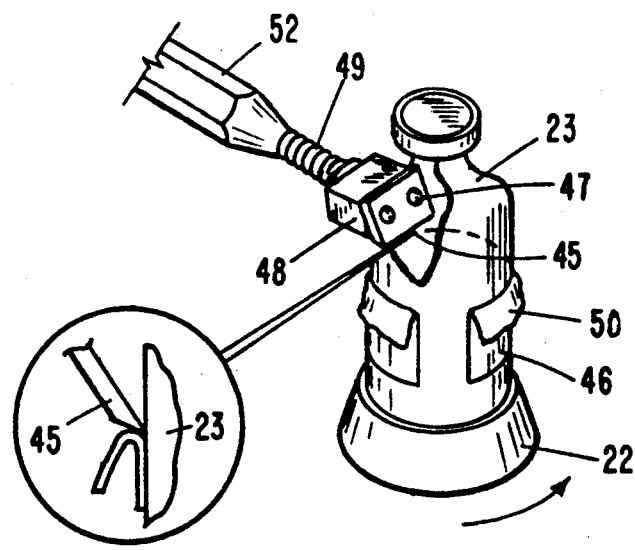
FIG. 3 is an enlarged front elevation showing an adhesive backed label and the attack angle of a tilted blade which is forced between the adhesive and the host bottle.

Refer now to FIG. 3 showing an enlarged perspective in front elevation showing a partial wrap around adhesive backed label being removed as an integral unit. The blade 45 on blade holder 48 is tilted at a preferred angle so as to be forced behind the label and the adhesive as the container 23 is rotated into the upward tilted blade 45. If the blade is forced sufficiently hard against the container and maintained at a sharp attack angle and a preferred tilt angle the blade will not cut the label but will be forced behind the adhesive and the adhesive and the label will be peeled from the container in the form of a flared skirt 50 when the label is a partial wrap around label and in the form of a cylindrical skirt when the label is a full wrap around label as will be explained hereinafter. As the blade 45 continues its downward movement in FIG. 3 the label is completely removed with the adhesive side out in the form of a tapered or flared skirt and the left edge of the blade 45 is moved by the aforementioned cam means 34, 35 so that it lines up with the center line at a point below the label and the label may be easily removed as an integral unit without creating peeled strips of label and particles as was the case with the prior art stripping machines.

Figure 4:
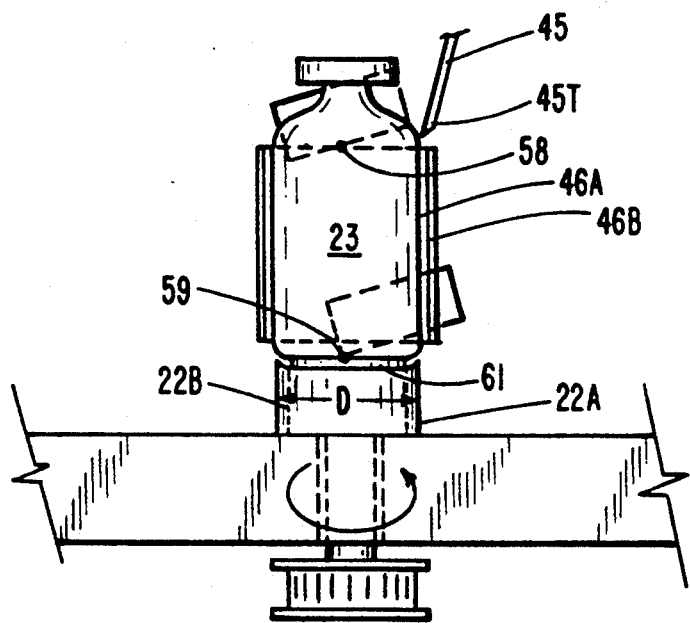
FIG. 4 is an enlarged elevation similar to FIG. 3 showing the tilted angle of the blade employed to peel and remove adhesive backed labels from cylindrical containers.

Refer now to FIG. 4 showing an enlarged section in elevation similar to FIG. 3 and showing the tilt angle of the blade 45 in its upper most position where it starts its contact and peeling action at point 58 and finishes its peeling or removal action at point 59. The label 46 is shown exaggerated comprising an adhesive portion 46A and a label portion 46B. By showing the thicknesses of the label portions 46A and 46B. It will be understood that the blade 45 when provided with a sharply tapered portion 45T can be forced behind the label portion 46B and behind the adhesive portion 46A so as to completely remove the label portion 46B with the adhesive 46A thereon, thus, substantially removing all of the adhesive from the container 23 and at the same time removing the label 46 as an integral unit with the adhesive side out. A rotatable platform 22A is shown having the same diameter D as the cylindrical container 23 and being provided with a cushion 61 which helps the container 23 to be centered on the rotatable platform 22A by the edge guides of the platform 22A. It is possible to make a cylindrical shaped platform 22B as shown by the phantom lines which is operable with complete wrap around and partial Wrap around labels but does not perform any centering function and depends on the upper clamp or idling pully 24 to perform the centering operation.

Figure 5:
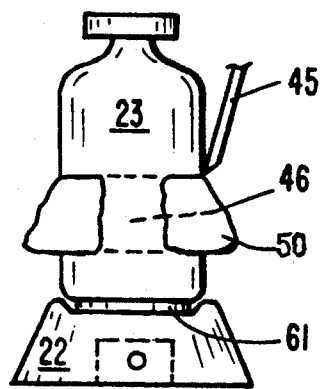
FIG. 5 is another enlarged elevation of a container showing a partial wrap around label being removed by a tilted blade to produce an integral adhesive side out flared skirt label.

Refer now to FIG. 5 showing another enlarged elevation of a container 23 having a partial wrap around label 46 which is half removed by a blade 45. The platform 22 is shown having a tapered shape so as to accommodate the flared skirt 50 shown being produced in FIG. 5 when a partial wrap around label 46 is being removed.

Figure 6:
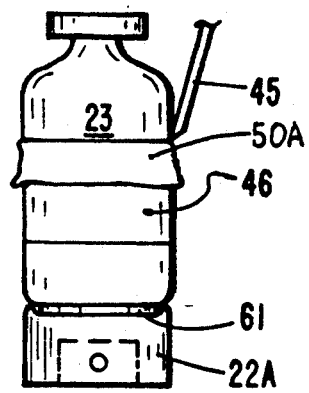
FIG. 6 is an enlarged elevation of a container having a full wrap around label showing the preferred embodiment tilted blade removing the adhesive label so as to produce an adhesive side out cylindrical skirt label.

Refer now to FIG. 6 showing an elevation of a container having a full wrap around label 46 being removed by a blade 45. The blade 45 compresses the label 46 in the vertical direction and expands a portion 50A of the label 46 in the circumferential direction so that the label peels away from the container 23 and is turned wrong side out with the adhesive side out as the blade 45 is moved vertically down the container. The rotatable platform 22A is also provided with a cushion 61 so as to assist in centering the container 23 as it is clamped by the rotatable idler 24.

Having explained a preferred embodiment of the present invention it will be understood that the blade 45 need not be razor sharp as was the case with the prior art strippers that cut the labels into spiral pieces. It is important that the blade 45 have a Rockwell hardness of around Rockwell 63 which is almost as hard as glass but will not scratch glass containers. It is believed that the engagement of the sharply tapered blade assist in positioning the blade behind the adhesive layer 46A. It is also believed that the tilt of the blade 45 assist in positioning the blade 45 behind the adhesive layer 46A. While it is known that the labels 46 can be removed with the adhesive side out at slow descending speeds of the blade 45, it is also known that too rapid a descent of the blade 45 can result in disrupting the peeling operation and causing deterioration of the label, thus too rapid a descent should be avoided to maintain the removed label as an integral unit so that particles of the label and adhesive are not redeposited in the label removing machine or on the container which is preferably left in a clean state and ready for relabeling or reuse without time consuming cleaning or processing operations as was required in the prior art. It is possible to place a new label on the container shortly after removing the old label so that a minimum interruption occurs in the relabeling process thus, reducing subsequent mislabling.

What is claimed is:

1. A method of clean removing labels and adhesives from a container, comprising the steps of:
    mounting a cylindrically shaped container on a rotary platform,
    affixing said container to said platform,
    rotating said container on said platform at a predetermined rotary speed,
    engaging said container above the label to be removed with a blade at a tilted angle,
    moving said tilted blade substantially vertically across said label at a speed slow enough to clean peel the label and all adhesive from the container, whereby
    said label and said adhesive are removed together as a unit label and the label is removed as an integral skirt disposal unit leaving substantially no adhesive on the container.

2. A method as set forth in claim 1 wherein said step of rotating said container comprises the steps of varying the speed of rotation from a low speed to a high speed which does not produce label disintegration.

3. A method as set forth in claim 1 wherein said step of rotating said container comprises the steps of increasing the speed of rotation until a test label deteriorates and then reducing the speed of rotation for subsequent labels until no label particles or deterioration are observed.

4. A method as set forth in claim 1 wherein said tilted blade is tilted from the horizontal at an angle between one and thirty degrees and has a Rockwell hardness slightly lower than the Rockwell hardness of said container.

5. A method as set forth is claim 1 wherein said step of moving said tilted blade across said label comprises the steps of varying the speed of moving said tilted blade vertically from a low speed to a high speed which does not produce label deterioration.

6. A method as set forth in claim 1 wherein said step of moving said tilted blade across said label comprises the steps of increasing the speed of the vertical movement of said blade until a test label deteriorates and then reducing the speed of the vertical movement of said blade for subsequent labels until no deterioration is observed.

7. A method of removing a label mounted with adhesive on a cylindrical container, comprising the steps of:
    rotating said container with said adhesive mounted label thereon about a vertical axis,
    engaging said label with a blade tilted from the horizontal axis,
    peeling said label as an integral unit from said container by forcing said tilted blade vertically between said adhesive and said container to remove and fold said label and said adhesive into an integral unit formed as an adhesive side out skirt that is larger in diameter than the original label.

8. A method of removing a label as set forth in claim 7 wherein said label is partially wrapped around said container and said step of peeling said label comprises forming a flared or tapered skirt with the adhesive side out.

9. A method of removing a label as set forth in claim 7 wherein said label is totally wrapped around said container and said step of peeling said label from said container comprises forming a reverse folded cylinder that is larger than in diameter than the original label and has its adhesive side out.

* * * * *